July 2, 1963   M. LEVINE   3,096,203
COATING SYSTEM
Filed June 1, 1961
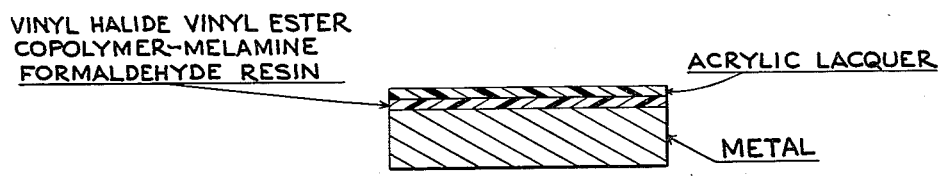
INVENTOR.
MORRIS LEVINE
BY
Oscar␣␣Spencer
ATTORNEY 3,096,203
COATING SYSTEM
Morris Levine, Cleveland Heights, Ohio, assignor to Pittsburgh Plate Glass Company, Pittsburgh, Pa., a corporation of Pennsylvania
Filed June 1, 1961, Ser. No. 114,243
8 Claims. (Cl. 117—75)

This invention relates to a flash primer-acrylic lacquer topcoat automotive finishing system. More particularly, this invention relates to a coating system for automobiles which has extremely good "cold cycle" resistance.

Because acrylic lacquers, particularly those lacquers which are composed primarily of methyl methacrylate polymers or copolymers, have extremely good resistance to weathering, they have been applied extensively as topcoats in automotive finishing systems. Acrylic lacquers have been found to maintain a high degree of gloss over long periods of exposure to sunlight, cold, heat, high humidity, ice and many chemical solvents which are commonly used around automobiles. Because of the fact that acrylic lacquers have poor adhesion to metallic surfaces, they must be employed as topcoats over a primer and a surfacer or a primer-surfacer composition. Many of these primers, surfacers and primer-surfacer compositions, however, have been found to have certain disadvantages when used under acrylic lacquer topcoats. Many times they have been found to have poor adhesion to the acrylic lacquer topcoats or their coefficient of expansion is excessively divergent from the coefficients of expansion of the acrylic lacquers. The great diversity in coefficients of expansion manifests itself in the cracking of the acrylic lacquer topcoat. The fact that these acrylic lacquer topcoats are prone to cracking over many primers is quite a problem when there exists environmental changes in temperature. When the acrylic lacquer is applied to a primer which has good adhesion to the acrylic lacquer, the most common problem has been cracking of the surface upon exposure to outdoor weather conditions.

In order to simulate outdoor weather conditions to which automotive finishes are subjected, the automotive industry has instituted the "cold cycle" test. This test comprises subjecting a sample coating system sequentially to environments which are alternately cold and hot, the hot environment having high humidity. It has been arbitrarily decided that these acrylic lacquer coating systems must withstand at least fifteen of these hot and cold cycles without failure to be acceptable for use. This test determines whether or not the system has good resistance to cracking and also determines the humidity resistance of the system. As the coated sample is taken from the hot humid environment and immediately subjected to the extremely cold environment, it undergoes contraction. It is readily understood that this alternate expansion and contraction obtained from the repeated test cycles is a severe test of an acrylic lacquer coating system.

There are many different automotive primers in use, but many of these require a surfacer which has a high percent of pigment by volume and which must be ground to obtain good holdout of the topcoat. Moreover, many of these systems require a separate baking step in order to cure the primer so that adequate protection of the surface is obtained.

It has been found in certain instances that primer compositions may be merely flashed of solvent, coated with the topcoat or surfacer and topcoat and subsequently baked as a unit so that the primer is cured simultaneously with the topcoat. Even these primers require high pigmentation or a highly pigmented surfacer superimposed upon them.

It has now been discovered that a simple blending of a vinyl halide-vinyl ester copolymer with a melamine-formaldehyde resin results in a composition which has extremely good adhesion to a metal surface and that when this composition is used as a pigmented or unpigmented primer under an acrylic lacquer topcoat and subjected to the aforementioned "cold cycle" test, extremely good results are obtained.

The invention is characterized by a metal article having a hard, adherent, crack-resistant, multiple-layer coating comprising a layer of primer and a superimposed layer of a methyl methacrylate lacquer in adherent contact therewith, said primer consisting essentially of (1) from about 55 percent by weight to about 94 percent by weight of a copolymer of vinyl chloride and vinyl acetate, (2) from about 6 percent by weight to about 25 percent by weight of a melamine-formaldehyde resin and (3) from 0 percent to about 20 percent of a glycidyl ether of a polyhydroxyl substituted aryl compound. It has been found advantageous to blend a certain amount (up to 20 percent by weight) of a low molecular weight epoxide resin to improve the corrosion resistance and increase the stability of the vinyl resin.

The instant coating systems may be cured from 30 to 90 minutes at 250° F. to 300° F.

The coating system of the instant invention is depicted in the accompanying drawing.

The vinyl halide is the predominant component in the copolymers or interpolymers, ordinarily being present in an amount of about 75 percent to 95 percent by weight, while the ester of an aliphatic monocarboxylic acid is present in an amount of about 5 percent to 15 percent by weight, although these proportions can be varied if desired.

The vinyl resin also contains a hydroxyl component in a minor proportion, ordinarily in an amount of about 1 percent to 10 percent by weight calculated as hydroxyl. One particularly useful vinyl resin contains approximately 90 percent vinyl chloride, approximately 5 percent vinyl acetate, and approximately 2 percent hydroxyl component (approximately 6 percent when calculated as vinyl alcohol). The above vinyl resin is readily available as a commercial product, as are other vinyl halide-vinyl ester copolymers which may be utilized in air drying flash primer compositions. One particularly desirable commercial resin is VAGH.

The vinyl resin is ordinarily utilized in an amount of about 65 percent to 80 percent by weight of the resinous components of the primer. However, larger or smaller amounts, for example, about 55 percent to 94 percent by weight, may also be utilized with satisfactory results.

It is desirable to include from 0.25 percent to 1.0 percent by volume of the total composition of a stabilizer for the vinyl halide resin. Examples of such stabilizers are tin laureate, propylene oxide, and the saturated polyesters such as Paraplex G–60 and Paraplex G–62 and the like.

The melamine-formaldehyde resins which may be used with the instant invention are preferably those which are considered to be fast curing. It is well known that various methods may be used to prepare these so-called fast curing melamine-formaldehyde resins. One method is to control the amount of methylolation so that there is obtained on the average of from about 3 to 4 methylol groups per molecule of melamine and to control the amount of butylation so that there is obtained on the average of about 1 etherified methylol group per melamine molecule. As the butylation and methylolation are increased the time which is necessary to obtain a full cure of the melamine-formaldehyde resin increases until 6 etherified methylol groups are obtained per molecule of melamine.

Melamine-formaldehyde resins which are to be used with the instant invention preferably do not have more than 4 methylol groups per molecule of melamine with not more than 1 of the methylol groups per molecule of melamine being butylated. The butylation is increased in order to enhance the compatibility of the melamine-formaldehyde with other resins.

The melamine-formaldehyde resin may be employed in amounts ranging from about 6 percent by weight to about 25 percent by weight of the total resin solids, but preferably this resin should be present in amounts ranging from about 8 percent to about 15 percent by weight of the total resin solids. Examples of the fast curing melamine-formaldehyde resins include the Resamine series such as Resamines 872, 876, 879 and RL008.

The epoxide resin which may be utilized in the primer compositions of this invention may vary slightly in chemical structure. These materials, which are ordinarily polyglycidyl ethers of bisphenols, or polyether derivatives of polyhydric phenols containing epoxide groups, are formed by the reaction of bisphenols with epichlorohydrin, and range from viscous liquids to hard, brittle resins. A representative epoxy resin structure may be illustrated as follows:

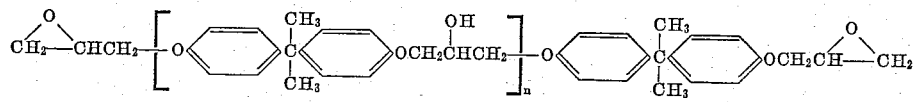

In the foregoing structure, $n$ is a number of a magnitude dependent upon the degree to which the etherification is carried. The most simple epoxy resin will be free of functional groups other than epoxide and hydroxyl groups, and will contain at least 4 carbon atoms, as illustrated by 1,2-epoxy-3,4-epoxy butane. More complex epoxy resins, such as those which result from the reaction of two or more moles of a diepoxide with one mole of a dihydric phenol, or from the reaction of three or more moles of a diepoxide with one mole of a trihydric phenol, and diepoxides or polyepoxides derived by polyhydric alcohols such as sorbitol, pentaerythritol, or polyallyl alcohols, may also be used. Among the many phenolic compounds utilized in the preparation of epoxy resins are included the following:

Bis(4-hydroxy-phenyl)2,2-propane
4,4'-Dihydroxybenzophenone
Bis(4-hydroxy-phenyl)1,1-ethane
Bis(4-hydroxy-phenyl)1,1-isobutane
Bis(4-hydroxy-phenyl)2,2-butane
Bis(4-hydroxy-tertiary butyl phenyl)2,2-propane
Bis(2-hydroxy-naphthyl)methane
1,5-Dihydroxy-naphthalene The epoxy component of the epoxy resins may be selected from compounds of the following group:

1-Chloro-2,3-epoxy propane (epichlorohydrin)
1-Chloro-2,3-epoxy butane
1-Chloro-3,4-epoxy butane
2-Chloro-3,4-epoxy butane
1-Chloro-2-methyl-2,3-epoxy butane
1-Bromo-2,3-epoxy pentane
2-Chloromethyl-1,2-epoxy butane
1-Bromo-4-methyl-3,4-epoxy pentane
1-Bromo-4-ethyl-2,3-epoxy pentane
4-Chloro-2-methyl-2,3-epoxy pentane
1-Chloro-2,3-epoxy octane
1-Chloro-2-methyl-2,3-epoxy octane
1-Chloro-2,3-epoxy decane The liquid epoxy resins (those having a molecular weight below 500 and preferably in the range of about 350-450) can be employed with the instant invention. The solid resins are undesirable because they are incompatible with the other components and also because they destroy the adhesion to the acrylic topcoat. The commercially available epoxy resins which may be used with the instant invention include the lower members of the Epon series, such as Epon 834 and those having lower molecular weights.

The quantity of the epoxide resin which may be blended with the other resinous components to form primer compositions may be varied considerably. For example, amounts as low as about 1 percent will enhance the corrosion resistance properties of the coating compositions. On the other hand, amounts as high as 20 percent by weight of the resinous components can also be employed, the higher amounts being desirable if the primer is to be used as a baked primer rather than as a flash primer. Preferably, the amount of epoxy resin employed is within the range of about 3 percent to 8 percent by weight of the resinous components of the compositions.

The epoxide resin functions to improve corrosion resistance and also acts as a stabilizer for the vinyl resin, and eliminates "filiform corrosion," a phenomenon characterized by threadlike underfilm corrosion beginning at the edge of the metallic surface and working across said surface.

No special expedients are necessary in formulating the coating compositions of this invention. For example, they may be prepared simply by incorporating the resinous components in a suitable solvent system by simple agitation or each resinous component may be dissolved in a solvent and the resulting solutions combined to form finished coating compositions.

The solvent system may be any suitable combination of organic solvents, depending primarily on the flash drying time desired. One particularly useful solvent system includes toluene, and methyl ethyl ketone, isobutyl acetate, xylene, Cellosolve acetate, and acetone with the toluene, acetone and ethyl alcohol comprising the predominant components of this system. Other solvents which may be employed include terpenes, aliphatic and aromatic naphthas, and the like. Ordinarily the solvent will comprise about 75 percent to 90 percent by weight of the total coating compositions, although of course larger or smaller amounts may be utilized depending upon the solids content desired. For example, it may be desirable to formulate the flash primer with a relatively high solids content and then reduce it to spraying consistency prior to the time of application.

A pigment is generally included in the formulation to provide hiding power and a spray guide for thickness. Suitable pigments include carbon black, iron oxide, lithopone, magnesium silicate, chrome yellow and calcium chromate.

The acrylic lacquers which are used as topcoats with the instant invention include those made from polymers and copolymers of methyl methacrylate. A particularly desirable class of these methyl methacrylate copolymers is described in copending U.S. application Serial No. 584,474 filed May 14, 1956. Duracryl and Lucite are names of commercially available acrylic lacquers.

The following examples are given by way of illustration and not by way of limitation. All parts and percentages are by weight unless otherwise specified.

EXAMPLE I

A typical pigmented primer composition was prepared as follows:

| | Parts by weight |
|---|---|
| Lampblack pigment (Molacco black) | 32.00 |
| Calcium chromate pigment | 8.00 |
| Melamine-formaldehyde resin (Resamine 876) | 4.25 |
| Butyl acetate | 32.61 |
| Xylene | 63.23 |

The above ingredients were charged into a pebble mill and ground for 16 hours and 10 parts of the following solution A were added to the mill:

Solution A

| | |
|---|---:|
| 91 vinyl chloride, 3 vinyl acetate, 6 vinyl alcohol interpolymer solution (Vinylite solution of VAGH 20 percent solids in a 50 methyl isobutyl ketone 50 xylene solvent mixture) | 102.00 |
| Epoxy resin (Epon 834 in Solvesso 57 percent solution) | 8.70 |
| Hexone | 446.90 |
| Toluene | 159.30 |
| Propylene oxide | 1.73 |

The above ingredients were then ground for 2 hours in the pebble mill. The following ingredients were added and the entire mixture was ground until homogeneous.

| | Parts by weight |
|---|---:|
| Solution A | 62.25 |
| Toluene | 35.90 |
| Propylene oxide | 7.17 |
| Epoxy resin (Epon 834, X-90 90 percent resin, 10 percent xylene) | 9.47 |
| Melamine-formaldehyde resin (Resamine 876) | 20.70 |
| Butyl acetate | 61.50 |

The above composition was sprayed on phosphatized steel panels (Bonderite 100), flashed to remove solvent and sprayed with an acrylic lacquer (Duracryl). The coated panels were then baked for 45 minutes at 285° F.

The coated panels were cooled and placed in an atmosphere having 100 percent relative humidity and a temperature of 100° F. and subjected to this environment for 24 hours. They were then chilled to −10° F. in a cold box, after which they were allowed to warm 1 hour to room temperature and observed for cracks. After 3 more hours the above cycle was repeated more than 15 times. After the fifteenth cycle the panels manifested no cracks.

Equally good results are obtained when the epoxy resin is excluded from the composition of Example I.

EXAMPLE II

When Example I is repeated using the identical composition without the use of any pigment, equally good results are obtained.

EXAMPLE III

When Example I is repeated without the presence of the vinyl stabilizer (propylene oxide), equally good results are obtained.

While specific examples of the invention have been set forth hereinabove, it is not intended that the invention be limited solely thereto, but to include all of the variations and modifications falling within the scope of the appended claims.

I claim:
1. A metal article having a hard, adherent, crack-resistant, multiple layer coating comprising a layer of primer and a superimposed layer of a methyl methacrylate lacquer therewith, said primer consisting essentially of (1) from about 55 percent by weight to about 94 percent by weight of a hydroxyl-containing copolymer of a vinyl halide and a vinyl ester, (2) from about 6 percent by weight to about 25 percent by weight of a melamine-formaldehyde resin, and (3) up to about 20 percent by weight of a glycidyl ether of a polyhydroxyl substituted aryl compound.

2. The metal article of claim 1 wherein the copolymer is a copolymer comprising from about 75 percent by weight to about 95 percent by weight of vinyl chloride and from about 5 percent by weight to about 15 percent by weight vinyl acetate and from about 1 percent to about 10 percent by weight of hydroxyl.

3. The metal article of claim 2 wherein the glycidyl ether is a glycidyl ether of bis(4-hydroxy phenyl) 2,2-propane.

4. The metal article of claim 2 wherein the melamine-formaldehyde resin has an average of from 3 to 4 methylol groups per melamine molecule and an average of about 1 etherified methylol group per molecule.

5. A metal article having a hard, adherent, crack-resistant multiple-layer coating comprising a layer of primer and a superimposed layer of a methyl methacrylate lacquer therewith, said primer consisting essentially of (1) from about 65 percent by weight to about 80 percent by weight of a hydroxyl-containing copolymer of a vinyl halide and a vinyl ester, (2) from about 8 percent by weight to about 15 percent by weight of a melamine-formaldehyde resin and (3) from up to about 20 percent of a glycidyl ether of bis(4-hydroxy-phenyl)2,2-propane having a molecular weight in the range from about 350 to about 450.

6. The metal article of claim 5 wherein the copolymer is a copolymer of about 91 percent vinyl chloride, about 3 percent vinyl acetate and about 6 percent hydroxyl calculated as vinyl alcohol.

7. The metal article of claim 5 wherein there is included a vinyl stabilizer.

8. The metal article of claim 7 wherein the vinyl stabilizer is propylene oxide.

References Cited in the file of this patent

UNITED STATES PATENTS

| 2,669,549 | Darby | Feb. 16, 1954 |
| 2,892,716 | Martin | June 30, 1959 |
| 2,956,902 | Greif | Oct. 18, 1960 |

OTHER REFERENCES

Modern Plastics Encyclopedia, September 1959, vol. 39, No. 1A, page 176 relied on.